United States Patent
Wang et al.

(10) Patent No.: US 7,538,518 B2
(45) Date of Patent: May 26, 2009

(54) METHOD FOR DETECTING A DEFECTIVE CHARGER CIRCUIT

(75) Inventors: Ligong Wang, Round Rock, TX (US); John J. Breen, Harker Heights, TX (US); Jay L. Taylor, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 472 days.

(21) Appl. No.: 10/901,509

(22) Filed: Jul. 29, 2004

(65) Prior Publication Data

US 2006/0022637 A1  Feb. 2, 2006

(51) Int. Cl.
*H02J 7/00* (2006.01)

(52) U.S. Cl. .................................. 320/134; 320/112

(58) Field of Classification Search ................. 320/112, 320/116, 165, 134; 340/365, 500
See application file for complete search history.

(56) References Cited

U.S. PATENT DOCUMENTS

| | | | |
|---|---|---|---|
| 5,568,039 A | 10/1996 | Fernandez | |
| 5,796,238 A * | 8/1998 | Hiratsuka et al. | 320/112 |
| 5,818,200 A | 10/1998 | Cummings et al. | |
| 6,046,575 A * | 4/2000 | Demuro | 320/134 |
| 6,262,562 B1 | 7/2001 | Cummings et al. | |
| 6,316,915 B1 * | 11/2001 | Fujiwara et al. | 320/134 |
| 2004/0021440 A1 * | 2/2004 | Pannwitz | 320/100 |
| 2005/0174094 A1 * | 8/2005 | Purdy et al. | 320/134 |

* cited by examiner

*Primary Examiner*—Edward Tso
*Assistant Examiner*—Alexis Boateng
(74) *Attorney, Agent, or Firm*—Haynes and Boone, LLP

(57) ABSTRACT

In a method and system for detecting charger failure, a battery is operable to receive a charge from the charger via a pair of terminals. The battery includes an analog front end (AFE) coupled to the pair of terminals. The AFE is configured to receive at least one input corresponding to voltage measured across the pair of terminals. A battery controller included in the battery is coupled to the AFE by a serial link. The battery controller receives the at least one input via the serial link. In response to the voltage being below a predefined value, the battery controller is placed in a charge_not_received state, which is indicative of the charger being defective.

21 Claims, 4 Drawing Sheets

METHOD FOR DETECTING A DEFECTIVE CHARGER CIRCUIT

BACKGROUND

The present disclosure relates generally to information handling systems, and more particularly to techniques for detecting defective chargers commonly used to recharge batteries providing power to portable information handling system components such as notebook computers, personal digital assistants, cellular phones and gaming/entertainment devices.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A battery converts chemical energy within its material constituents into electrical energy in the process of discharging. A rechargeable battery is generally returned to its original charged state (or substantially close to it) by a charger circuit, which passes an electrical current in the opposite direction to that of the discharge. Presently well known rechargeable battery technologies include Lithium Ion (LiON), Nickel Cadmium (NiCd), and Nickel Metal Hydride (NiMH). In the past, the rechargeable batteries (also known as "dumb" batteries) provided an unpredictable source of power for the portable devices, since typically, a user of the device powered by the battery had no reliable advance warning that the energy supplied by the rechargeable battery was about to run out.

Today, through the development of "smart" or "intelligent" battery packs, batteries have become a more reliable source of power by providing information to the IHS and eventually to a user as to the relative state of charge (RSOC), as well as a wealth of other information. Such a battery is typically equipped with electronic circuitry to monitor and control its operation. The information is typically communicated to the IHS using a well-known System Management Bus (SMBus), which is widely used in the industry. Information pertaining to the battery being communicated via the SMBus connection may include data elements such as battery status, manufacturer name, serial and model number, voltage, temperature and charge status.

Batteries are well known that can monitor internal charge levels and shut down a load coupled thereto when the battery can no longer provide the minimum power required to operate the load. Upon discharge, the user typically restores the charge level of the battery by deploying a charger circuit during a recharge process. Typically, a charger circuit resides on a motherboard of the portable IHS. However, identifying charger circuit failures is difficult with the current circuitry available within the motherboard without duplicating some of the circuitry included in the battery. Modifying the motherboard to duplicate some of the circuitry is less desirable since it increases costs, utilizes additional space and generates more heat.

The battery may include techniques to determine if the charger circuit is operating properly, e.g., by determining difference in RSOC level over a period of time. However, such techniques may not be suitable for determining defective charger circuits. For example, a user of the portable IHS may observe in a system status portion of a display screen a battery icon being charged. The user may conclude that the battery is receiving a charge yet the battery is not being charged. That is, a relative state of charge (RSOC) of the battery is not increasing or changing substantially after receiving or being charged for a predefined time period. The typical response to the battery not being charged is to identify the battery as defective and request a replacement. Thus, defects in the charger circuit may often be misidentified as faulty batteries, which are generally returned to the manufacturer for a replacement.

An analysis of data on batteries returned to the manufacturer indicated that approximately 60% of such returned batteries were attributed to a 'failure to charge' defect. As a solution, the manufacturer typically verified the authenticity of the returned battery and sent a replacement battery to the user. However, the user usually reports the same problem with the new replacement. Eventually, the manufacturer concludes that the root problem may not be with the battery but may reside in the charger circuit. A new motherboard is sent as a replacement to fix the problem. This observation is confirmed after performing tests on returned batteries, which indicate that approximately 70% of the batteries identified as defective were in fact working to specification. Obviously, faulty identification of defective charger circuits as faulty batteries increases costs to manufacturers and decreases customer satisfaction.

Therefore, a need exists to provide a method and system for detecting failures in charger circuits, which are operable to restore the charge level of the battery during the recharge process. Additionally, a need exists to provide an improved technique to detect failures in charger circuits without substantially increasing costs, adding space and generating more heat. Accordingly, it would be desirable to provide a method for detecting failures in charger circuits to charge batteries included in an information handling system absent the disadvantages found in the prior methods discussed above.

SUMMARY

The foregoing need is addressed by the teachings of the present disclosure, which relates to a system and method for detecting a failure in a charger providing power to an IHS. According to one embodiment, in a method and system for detecting charger failure, a battery is operable to receive a charge from the charger via a pair of terminals. The battery includes an analog front end (AFE) coupled to the pair of terminals. The AFE is configured to receive at least one input corresponding to voltage measured across the pair of terminals. A battery controller included in the battery is coupled to the AFE by a serial link. The battery controller receives the at least one input via the serial link. In response to the voltage being below a predefined value, the battery controller is placed in a charge_not_received state, which is indicative of the charger being defective.

Several advantages are achieved by the method and system according to the illustrative embodiments presented herein. The embodiments advantageously provide for an improved technique to detect a failure of a charger operable to charge a battery by leveraging unused or spare inputs available within the battery. Thus, failures in the charger are detected without substantially increasing costs, and/or by adding hardware components, which occupy more space, generate more heat and add complexity thereby reducing reliability.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

A failure in a charger operable to charge a smart battery, i.e. a battery including a controller, is often misidentified as a failure of the battery. A user of the portable IHS may observe a battery icon being charged on a display screen. However, since the RSOC of the battery is not changing substantially after being charged for a predefined time period the user may conclude that the battery is not being charged properly. The battery is typically returned to the manufacturer for replacement. Tests conducted on the returned battery conclude that the battery is working properly. Thus, faulty identification of defective charger circuits as faulty smart batteries increases costs to manufacturers and decreases customer satisfaction. There is a need for a cost effective mechanism to detect failures in charger circuits.

According to one embodiment, in a method and system for detecting charger failure, a battery is operable to receive a charge from the charger via a pair of terminals. The battery includes an analog front end (AFE) coupled to the pair of terminals. The AFE is configured to receive at least one input corresponding to voltage measured across the pair of terminals. A battery controller included in the battery is coupled to the AFE by a serial link. The battery controller receives the at least one input via the serial link. In response to the voltage being below a predefined value, the battery controller is placed in a charge_not_received state, which is indicative of the charger being defective.

Figure 1:
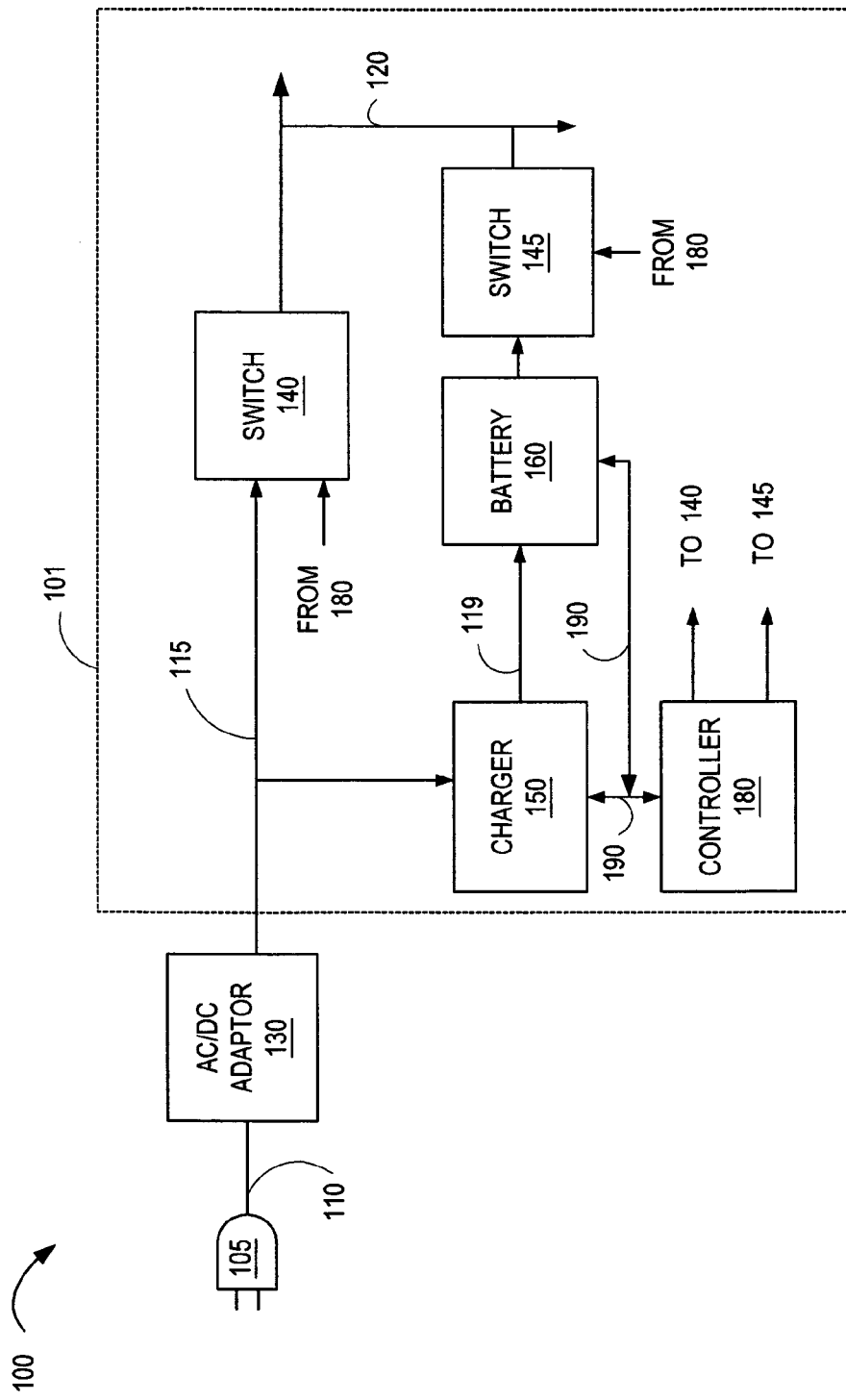
FIG. 1 illustrates a block diagram of a power supply system providing power to a portable IHS, according to an embodiment.

FIG. 1 illustrates a block diagram of a power supply system 100 providing power to a portable IHS device 101, according to an embodiment. The power supply system 100 receives and converts an alternating current (AC) power input 110 to a direct current power (DC) output 120 to power a load such as the portable IHS device 101 or components thereof. The AC power input 110 is generally received from a 120 V, 60 Hertz or 220 V, 50 Hertz signal source from a wall outlet 105.

An AC-DC adaptor 130 converts the AC voltage input 110 to a first DC voltage output 115 to provide DC power to a system power switch 140 and a charger device 150. The system power switch 140 provides DC power to other DC-DC converters (not shown) and/or other components (not shown) of the portable IHS device 101. The first DC voltage output 115 is nominally set to approximately 19.6 V, which is sufficiently high to charge a battery 160, included in the power supply system 100, to a fully charged state. The AC-DC adaptor 130 may utilize a well-known 'buck converter' design (not shown) for the power conversion. The charger device 150 generally converts the first DC voltage output 115 of the AC-DC adaptor 130 to a lower DC voltage 119 suitable to charge the battery 160 included in the power supply system 100.

A suitable voltage required to charge a battery may vary depending on the manufacturer. For example, Dell Computer Corporation (Round Rock, Tex., USA) provides 4 cells in series and 3 cells in series smart batteries for use in notebook computers such as a Dell Latitude™ D-Family dual battery notebook computer. The 4SXP battery has a stack voltage of approximately (12V-16.8V) and the 3SXP battery has a stack voltage of approximately (9V-12.6V). The trend is towards the development of newer batteries having a lower stack voltage such as approximately (6-9V).

A controller 180 included in the portable IHS device 101 is used for controlling the selection and operation of the battery 160 and AC power source 105 using various switches such as the system power switches 140 and 145. Thus, the controller 180 operating in conjunction with the battery 160, and the charger 150 controls the charging and discharging operation of the battery 160, as well as flow of power from the source 105 to a load, e.g., the device 101 by controlling the operation of the switches 140 and 145. The controller 180 may control the battery 160 and the charger 150 via well-known System Management Bus (SMBus) 190, and/or via dedicated, electrically conducting lines or paths. In one embodiment, the controller 180 is a keyboard controller.

Figure 2:
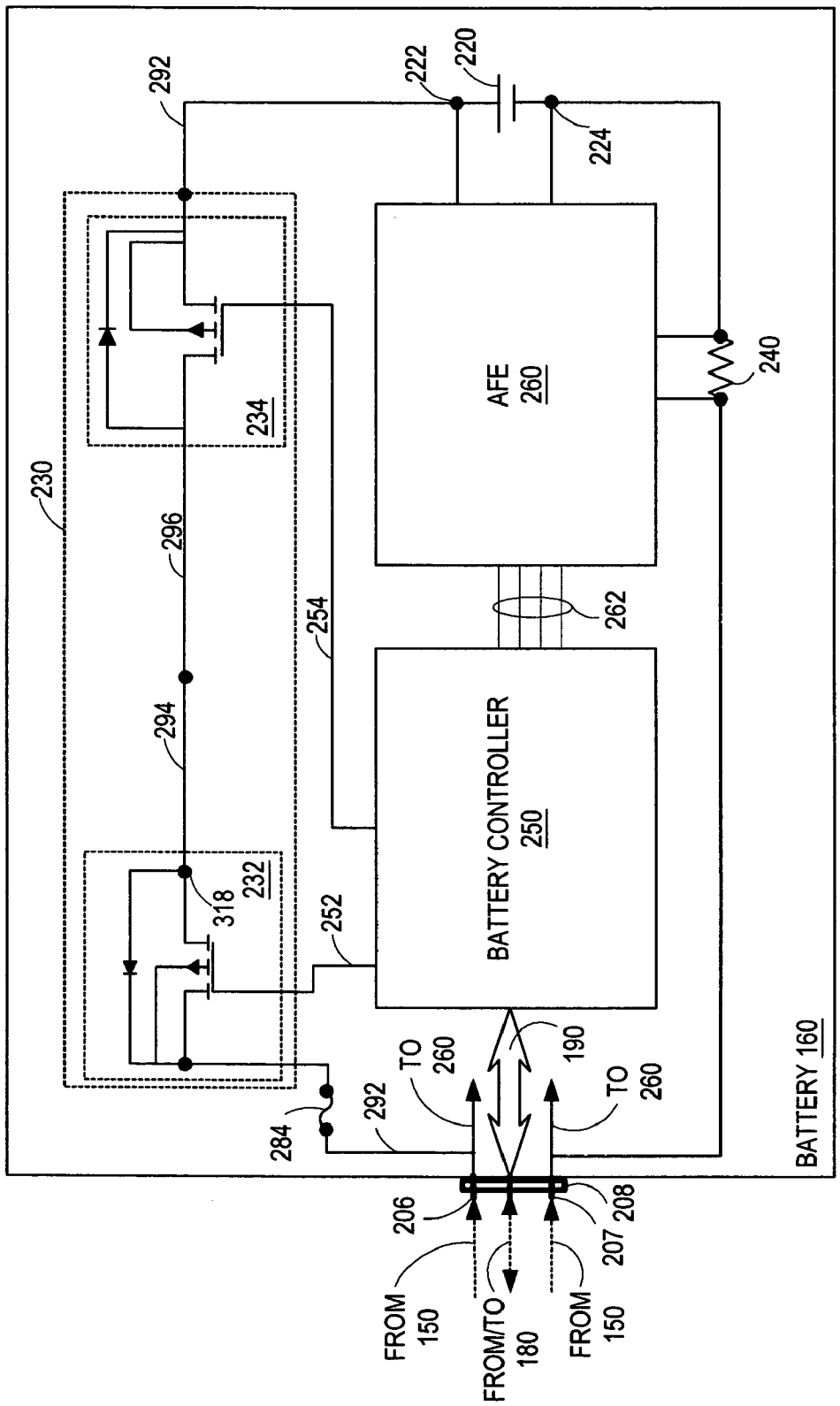
FIG. 2 illustrates additional details of the battery of FIG. 1, according to an embodiment.

FIG. 2 illustrates additional details of the battery 160, according to an embodiment. The charger 150 (not shown) is operable to provide a charge to the battery 160 via a pair of terminals during a charge mode of operation of the battery 160. In one embodiment, a connector 208 facilitates electrical coupling between the battery 160 and other external devices (not shown) such as the charger 150. The connector 208 includes a positive battery terminal 206 and a negative battery terminal 207, which may be used to receive charge during the charge mode or provide the charge during a discharge mode. The connections for the SMBus 190 may also be included on the same connector 208.

The battery 160 includes at least one rechargeable cell 220 having a positive cell terminal 222 and a negative cell terminal 224. Other cells may be present but are not shown. A charge discharge component 230 is operable to provide a conductive path 292 between the terminal 206, the rechargeable cell 220 and terminal 207. Included in the conductive path 292 is a sensor resistor 240 electrically coupled in series between the negative cell terminal 224 and the negative battery terminal 207. The resistor 240 is used to measure the current flowing through the battery 160. Also shown in the conductive path 292 is a fuse 284 to protect the battery 160 from over current conditions.

Included in the battery 160 is a battery controller 250. The battery controller 250, in co-ordination with the controller 180 (not shown), controls the various operating conditions of the battery 160 such as charge and discharge modes. The battery controller 250 communicates with the controller 180 via the SMBus 190 to co-ordinate the controls. The battery controller 250 receives inputs (both internal and external to the battery 160) and generates control outputs to control the operation of the battery 160.

During the charge and/or discharge process, the controller 180 may be used to authenticate the battery 160. The controller guards the charging process by only enabling authenticated smart batteries to receive the charge from the charger 150 and disabling counterfeit smart batteries from receiving the charge. As described herein any battery, which has failed the authentication process, is identified as a counterfeit battery. In one embodiment, a BIOS program (not shown) may be used to receive inputs to the controller 180 and generate outputs.

The battery controller 250 monitors various battery variables such as voltage, current, temperature, and charge level, e.g., RSOC, of the rechargeable cell 220. Using this information, the battery controller 250 and the controller 180 jointly control: a) the operating condition of the battery 160 such as the charging or discharging operation, and b) the above described authentication process of the battery 160 to enable the charging operation.

More specifically, the battery controller 250 monitors the energy level of the rechargeable cell 220. When requested by the controller 180, the battery controller 250 is operable to provide energy stored in the rechargeable cell 220 to other components of the portable IHS 101 (not shown) during a discharge operating condition. The battery controller 250 is operable to notify the controller 180 when the energy level of the rechargeable cell 220 falls below a predefined threshold level. During a charge operating condition, the battery controller 250 is operable to receive a charge from the charger 150 via battery terminals 206 and 207 and transfer the charge to the rechargeable cell 220 when required.

In the depicted embodiment, the battery controller 250 acquires information associated with the battery 160 via an analog front end (AFE) 260. The AFE 260 is electrically coupled to the battery controller 250 via a communications link 262 and/or via dedicated, electrically conducting lines or paths. The AFE 260 includes at least one analog-to-digital (A/D) converter (not shown) to acquire analog signals such as various voltages and currents and converts them to corresponding digital values. The AFE 260 is operable to receive a plurality of inputs on a multiplexed basis. In one embodiment, a discrete A/D converter may be used in a scaled down version of the AFE 260. In one embodiment, the functionality of the AFE 260 may not be performed by dedicated components (e.g., shown separately as AFE 260) but may be included in the functionality of the battery controller 250. That is, in one embodiment, the AFE 260 may be combined with the battery controller 250.

The process of configuring the AFE 260 involves the definition and/or assignment of specific inputs or variables to specific channels available within the AFE 260. The configuration process may also include assignment of other data acquisition attributes such as sampling time and frequency. The specific number of inputs supported by the AFE 260 may depend on the manufacturer and other factors such as number of rechargeable cells in series. In one embodiment, the AFE 260 is selected to have at least one spare input, which is configured to receive voltage input measured across battery terminals 206 and 207. In the depicted embodiment, battery terminals 206, 207, cell terminals 222, 224 and terminals for resistor 240 are electrically coupled to the AFE 260 to acquire corresponding voltage and current signals. In one embodiment, multiplexing of voltages may be required if the AFE 260 lacks at least one spare input.

In one embodiment, the input configured to receive voltage measurement across battery terminals 206 and 207 is used to determine whether the charger 150 is working as specified. For example, as described earlier in FIG. 1, the DC voltage 119 output of the charger 150 has to be sufficiently high and be suitable to charge the battery 160. If the voltage 119 is determined to be at least equal to a predefined value, then the battery controller 250 is placed in an 'available_to_receive_ charge' state. If the voltage 119 is determined to be less than the predefined value, then the battery controller 250 is placed in a 'charge_not_received' state. Thus, placing the battery controller 250 in the charge_not_received state is indicative of the charger 150 being defective and the available_to_receive_charge state is indicative of the charger 150 being operational and working as specified. The specific predefined value selected for the voltage 119 may vary from 6V to 18V and may depend on the attributes of the cell 220. The 'available_to_receive_charge' state and 'charge_not_received' state are configured as two additional modes of operation recognized by the controller 180 (in addition to other operating states such as charging, discharging, fully charged, critically discharged and the like).

In one embodiment, the charge discharge component 230 includes a first switching device 232 cascaded to a second switching device 234. The first (C-FET) switching device 232 may also be referred to as a charge field effect transistor and the second switching device 234 may also be referred to as a discharge field effect transistor (D-FET). The input of the first switching device 232 is coupled to terminal 206 and the output of the first switching device 232 is coupled to the input of the second switching device 234. The output of the second switching device 234 is coupled to cell terminal 222.

During the charging operation, the first switching device 232 is operable, responsive to a first control signal 252 received from the battery controller 250, to selectively switch on a first portion 294 of the conductive path 292 from the battery terminal 206 to the cell 220. Enabling the first switching device 232 transfers the charge received from the charger 150 to the cell 220. That is, the first control signal 252 is enabled is response to the battery controller 250 being placed in the available_to_receive_charge state. During the discharging operation, the second switching device 234 is responsive to a second control signal 254 received from the battery controller 250 to selectively switch on a second portion 296 of the conductive path 292.

In one embodiment, the first and second switching devices 232 and 234 are implemented using MOSFET body diodes. The MOSFET body diodes are advantageously used to minimize the impact of an accidental reverse connection of the battery 160 and/or other over-current causing conditions.

Figure 3:
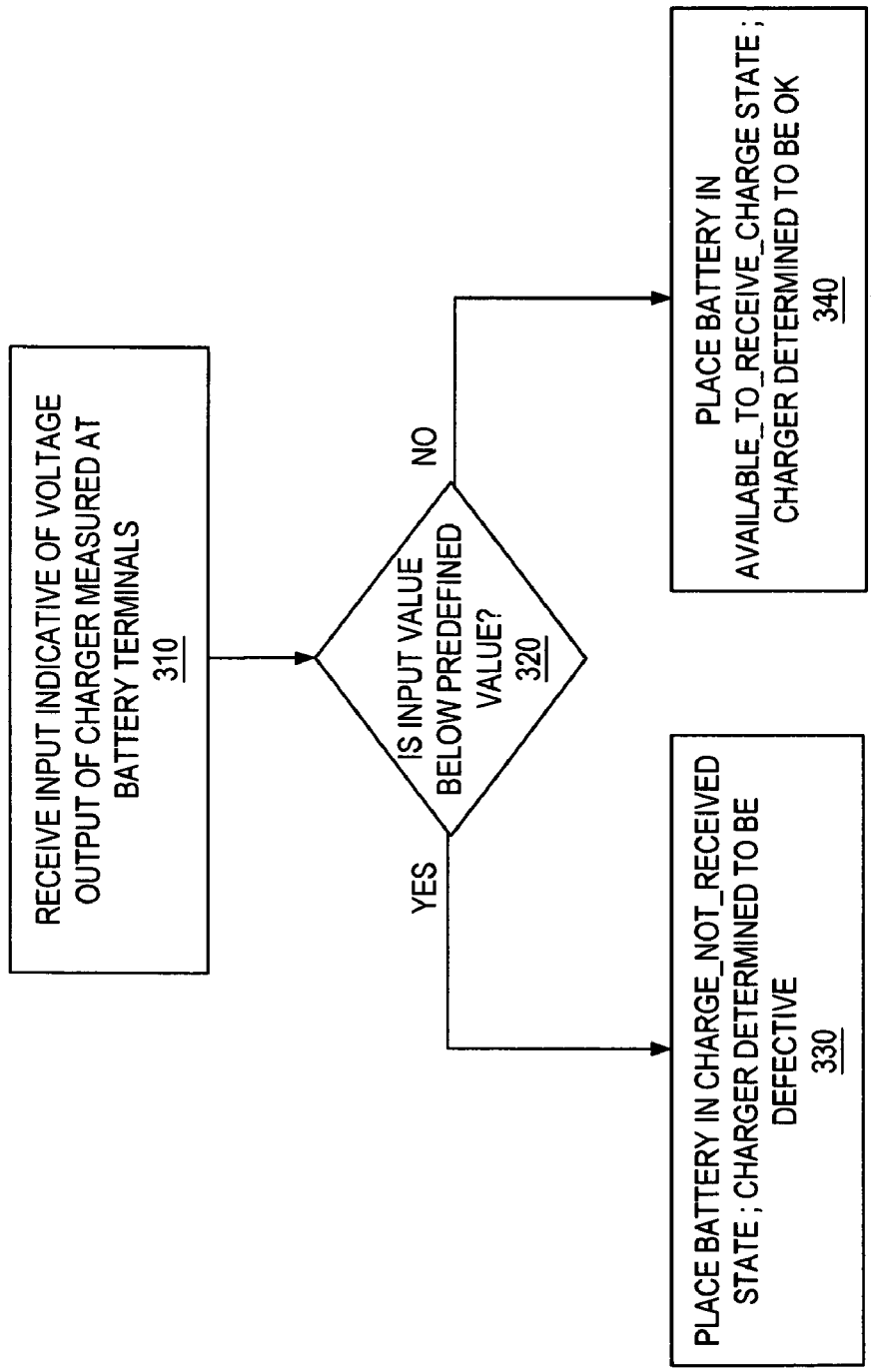
FIG. 3 is a flow chart illustrating a method for detecting failure of the charger operable to charge the battery of FIG. 1, according to an embodiment.

FIG. 3 is a flow chart illustrating a method for detecting failure of the charger 150 operable to charge the battery 160, according to an embodiment. In step 310, an input indicative of the voltage 119 output by the charger 150 is received. For example, a standard query from the IHS to the battery 160 is a request for the battery pack voltage value. This request may be used in a battery query to return the voltage 119 value output by the charger 150, while the charge FET (e.g., the first switching device 232) is open. In step 320 a determination is made whether the input is below a predefined voltage. In step 330, the input is determined to be below the predefined value. The battery 160 is placed in a charge_not_received state and the charger 150 is determined to be defective. For example, whenever the battery 160 receives a request from the controller 180 or just before starting charging, the battery controller 250 opens charge and discharge circuit to measure input voltage 119. Only if the predefined value in a battery register is detected, the battery controller 250 turns on charging circuit and sets relevant charging register inform the controller 180 that the battery 160 is in a normal charging mode. Otherwise, a charging error is reported to the controller 180, indicating a problem in receiving the charge. The problem is thus identified as other than a battery failure. In step 340, the input is determined to be at least equal to the predefined value. The battery is placed in an available_to_receive_charge state and the charger 150 is determined to be operational. Various steps described above may be added, omitted, combined, altered, or performed in different orders.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 4:
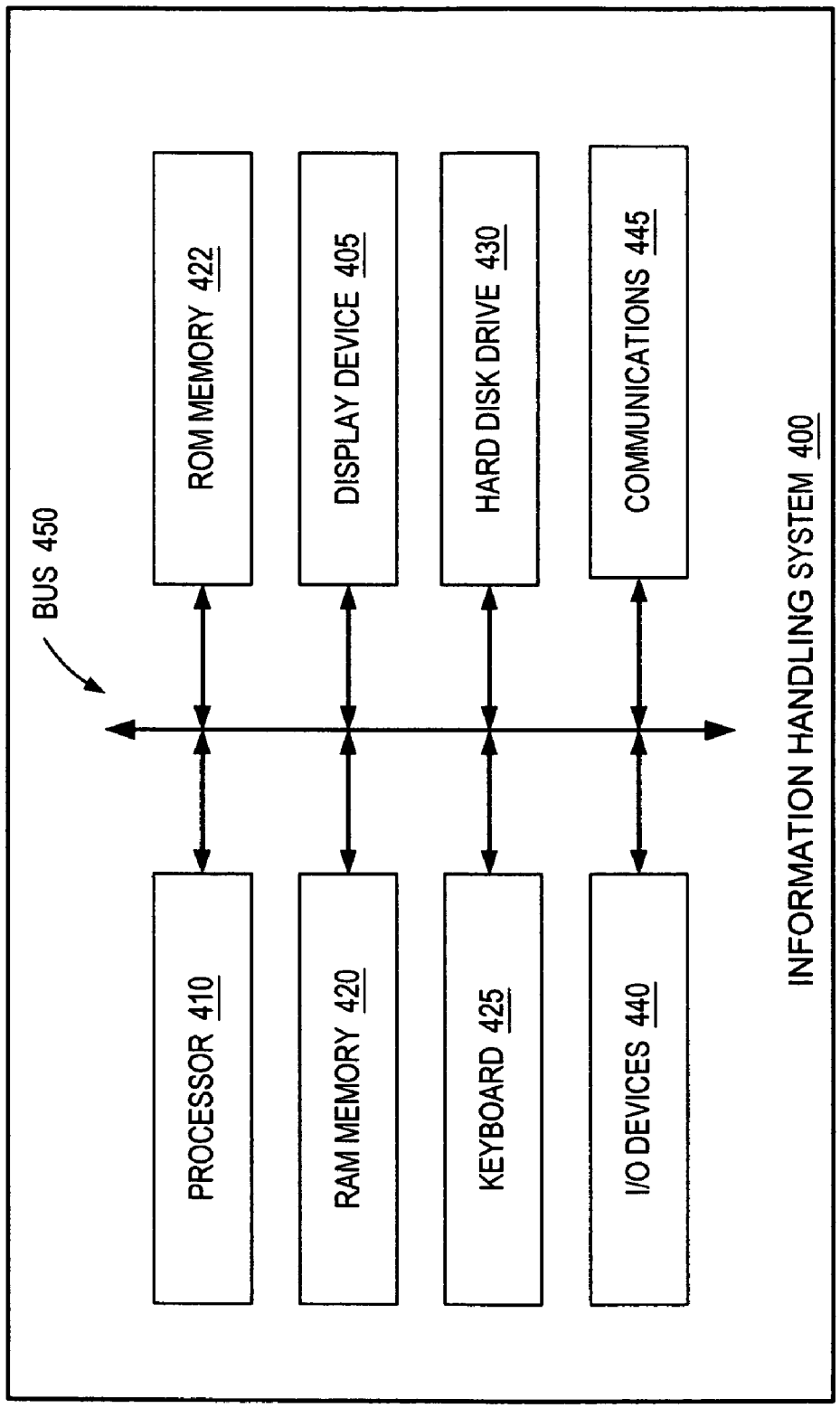
FIG. 4 illustrates a block diagram of an information handling system having an improved battery, according to an embodiment.

FIG. 4 illustrates a block diagram of an information handling system 400 having an improved battery (not shown), according to an embodiment. The information handling system 400 includes a processor 410, a system random access memory (RAM) 420 (also referred to as main memory), a non-volatile ROM 422 memory, a display device 405, a keyboard 425 and an I/O controller 440 for controlling various other input/output devices. In one embodiment, the I/O controller 440 is substantially the same as the controller 180 of FIG. 1. It should be understood that the term "information handling system" is intended to encompass any device having a processor that executes instructions from a memory medium. The IHS 400 is shown to include a hard disk drive 430 connected to the processor 410 although some embodiments may not include the hard disk drive 430. The processor 410 communicates with the system components via a bus 450, which includes data, address and control lines. In one embodiment, the IHS 400 may include multiple instances of the bus 450. A communications controller 445, such as a network interface card, may be connected to the bus 450 to enable information exchange between the IHS 400 and other devices (not shown).

In one embodiment, the portable IHS 101 device described in FIG. 1 is implemented as the IHS 400. In this embodiment, a power supply system (not shown) providing power to the IHS 400 incorporates the improved battery 160 (not shown) described in FIG. 2.

The processor 410 is operable to execute the computing instructions and/or operations of the IHS 400. The memory medium, e.g., RAM 420, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, it should be understood that while the battery 160 may be implemented as electronic hardware, it would be within the spirit and scope of the invention to encompass an embodiment using a controller/computer based software/firmware implementation. In one embodiment, the controller 180 through a diagnostic routine may determine the operation of the charger 150. This may be performed by querying the battery 160 for voltage value after the charger 150 is commanded to provide voltage but prior to the battery 160 connecting to the terminals 206 and 207 to receive a charge. This activity would occur on battery insertion, power up of the IHS 400, or change of power state such as availability of the AC adapter 130. Accordingly, it is appropriate that the appended claims be construed broadly and in a manner consistent with the scope of the embodiments disclosed herein.

What is claimed is:

1. A battery operable to receive a charge from a charger via a pair of terminals, the battery comprising:
   an analog front end (AFE) coupled to the pair of terminals, the AFE being configured to receive at least one input corresponding to voltage measured across the pair of terminals;
   a battery controller coupled to the AFE by a serial link and operable to communicate using a basic input/output system (BIOS), the battery controller receiving the at least one input via the serial link, the battery controller being placed in a charge_not_received state in response to the voltage being below a selected nonzero value, wherein placing the battery controller in the charge_not_received state is indicative of a charger being defective; and
   a rechargeable cell coupled with the AFE.

2. The battery of claim 1, wherein the battery includes:
   at least one rechargeable battery cell operable to store the charge received from the charger, wherein the AFE is coupled to the at least one cell, wherein the AFE is configured to receive additional inputs corresponding to voltage measured across the at least one cell.

3. In the battery of claim 1, wherein the battery controller is placed in an available_to_receive charge state in response to the voltage being at least equal to the predefined value.

4. In the battery of claim 3, placing the battery controller in the available_to_receive_charge state is indicative of the charger being operational.

5. The battery of claim 1, wherein the at least one input is a spare input prior to the at least one input being configured to receive the voltage.

6. In the battery of claim 1, wherein the battery includes:
a charge discharge component coupled to the battery controller, the pair of terminals and at least one cell, the at least one cell being operable to store the charge received from the charger, the charge discharge component being operable to provide a conductive path between the pair of terminals and the at least one cell in response to receiving an enable charge command as a control input from the battery controller.

7. In the battery of claim 6, wherein the AFE receives the at least one input when the conductive path is disabled in response to receiving a disable charge command as the control input from the battery controller.

8. In the battery of claim 6, wherein the battery controller is placed in an available_to_receive_charge state in response to the voltage being at least equal to the predefined value, wherein the conductive path is enabled is response to the battery controller being placed in the available_to_receive_charge state.

9. An information handling system (IHS) comprising:
a processor; and
a power supply operable to provide power to the processor, wherein the power supply includes:
a charger operable to provide a charge; and
a battery operable to receive the charge from the charger via a pair of terminals, wherein the battery includes:
an analog front end (AFE) coupled to the pair of terminals, the AFE being configured to receive at least one input corresponding to voltage measured across the pair of terminals; and
a battery controller coupled to the AFE by a serial link and operable to communicate using a basic input/output system (BIOS), the battery controller receiving the at least one input via the serial link, the battery controller being placed in a charge_not_received state in response to the voltage being below a selected nonzero value, wherein placing the battery controller in the charge_not_received state is indicative of a charger being defective.

10. The system of claim 9, wherein the battery includes:
at least one rechargeable battery cell operable to store the charge received from the charger, wherein the AFE is coupled to the at least one cell, wherein the AFE is configured to receive additional inputs corresponding to voltage measured across the at least one cell.

11. The system of claim 9, wherein the at least one input is a spare input prior to the at least one input being configured to receive the voltage.

12. In system of claim 9, wherein the battery includes:
a charge discharge component coupled to the battery controller, the pair of terminals and at least one cell, the at least one cell being operable to store the charge received from the charger, the charge discharge component being operable to provide a conductive path between the pair of terminals and the at least one cell in response to receiving an enable charge command as a control input from the battery controller.

13. In system of claim 12, wherein the AFE receives the at least one input when the conductive path is disabled in response to receiving a disable charge command as the control input from the battery controller.

14. In system of claim 9, wherein the AFE is combined with the battery controller.

15. A method of charging a battery operable to receive a charge from a charger via a pair of terminals, comprising:
receiving at an analog front end (AFE) at least one input corresponding to voltage measured across a pair of terminals, wherein the AFE is coupled to the pair of terminals; and
placing a battery controller in a charge_not_received state in response to the at least one input indicating a voltage across the pair of terminals being below a selected nonzero value, wherein placing the battery controller in the charge_not_received state is indicative of a charger being defective, and wherein the battery controller is operable to communicate using a basic input/output system (BIOS).

16. The battery of claim 1, wherein the battery controller is operable to communicate with an associated controller operable to control selection and operation of the battery and an AC power source.

17. The battery of claim 16, wherein the battery controller and the associated controller jointly control the battery operating condition and an authentication to enable charging the battery.

18. The system of claim 9, further comprising a controller in the IHS in communication with the battery controller to control selection and operation of the battery and an AC power source.

19. The system of claim 18, wherein the battery controller and the associated controller jointly control the battery operating condition and an authentication to enable charging the battery.

20. The method of claim 15, further comprising the battery controller communicating with an associated controller to control selection and operation of the battery and an AC power source.

21. The method of claim 20, further comprising the battery controller and the associated controller jointly controlling the battery operating condition and an authentication to enable charging the battery.

* * * * *

UNITED STATES PATENT AND TRADEMARK OFFICE
CERTIFICATE OF CORRECTION

PATENT NO. : 7,538,518 B2
APPLICATION NO. : 10/901509
DATED : May 26, 2009
INVENTOR(S) : Ligong et al.

It is certified that error appears in the above-identified patent and that said Letters Patent is hereby corrected as shown below:

Column 8, Line 59, delete "In the" and insert --The--

Column 8, Line 62, delete "In the" and insert --The--

Column 9, Line 1, delete "In the" and insert --The--

Column 9, Line 10, delete "In the" and insert --The--

Column 9, Line 17, delete "In the" and insert --The-

Column 9, Line 50, delete "In" and insert --The--

Column 10, Line 7, delete "In" and insert --The--

Column 10, Line 11, delete "In" and insert --The--

Signed and Sealed this

Nineteenth Day of January, 2010

David J. Kappos
*Director of the United States Patent and Trademark Office*